US012039346B2

United States Patent
Lu (10) Patent No.: US 12,039,346 B2
(45) Date of Patent: Jul. 16, 2024

(54) LOCK SCREEN DISPLAY PROCESSING METHOD, TERMINAL AND STORAGE MEDIUM

(71) Applicant: ZTE CORPORATION, Guangdong (CN)

(72) Inventor: Lijun Lu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/012,992

(22) PCT Filed: Jun. 10, 2021

(86) PCT No.: PCT/CN2021/099342
§ 371 (c)(1),
(2) Date: Dec. 27, 2022

(87) PCT Pub. No.: WO2022/001612
PCT Pub. Date: Jan. 6, 2022

(65) Prior Publication Data
US 2023/0244503 A1  Aug. 3, 2023

(30) Foreign Application Priority Data
Jun. 28, 2020  (CN) .......................... 202010598997.0

(51) Int. Cl.
*G06F 9/451* (2018.01)
*G06F 3/0481* (2022.01)
(Continued)

(52) U.S. Cl.
CPC ............ *G06F 9/451* (2018.02); *G06F 3/0481* (2013.01); *G06F 3/04842* (2013.01); *G06F 21/31* (2013.01); *G06F 2203/04803* (2013.01)

(58) Field of Classification Search
CPC .... G06F 9/451; G06F 3/0481; G06F 3/04842; G06F 21/31; G06F 2203/04803
See application file for complete search history.

(56) References Cited

U.S. PATENT DOCUMENTS 9,817,436 B2 * 11/2017 Christie ................ G06F 1/1656
10,802,705 B2 * 10/2020 Yang ..................... H04L 51/224
(Continued)

FOREIGN PATENT DOCUMENTS

| CN | 103135967 A | 6/2013 |
| CN | 106775753 A | 5/2017 |
| EP | 3278547 B1 | 10/2019 |

OTHER PUBLICATIONS

Centers, Josh, "Take Control of iOS 12," Oct. 2018, alt concepts inc., version 1.1.1, Chapters 1, 2, 4 (Year: 2018).*

(Continued)

*Primary Examiner* — Alvin H Tan
(74) *Attorney, Agent, or Firm* — MH2 TECHNOLOGY LAW GROUP LLP (57) ABSTRACT

Provided are a lock screen display processing method, a terminal, and a storage medium. The method includes: in a case where a screen display space of a current lock screen interface is detected to be insufficient, obtaining a message source category corresponding to a received notification message; and according to the message source category, displaying the notification message in a drawer layout arrangement.

13 Claims, 6 Drawing Sheets

(51) Int. Cl.
    *G06F 3/04842*    (2022.01)
    *G06F 21/31*    (2013.01)

(56) References Cited

U.S. PATENT DOCUMENTS

| | | | | |
|---|---|---|---|---|
| 11,086,497 | B2* | 8/2021 | Jeong | G06F 3/04883 |
| 11,157,448 | B2* | 10/2021 | McBeath | G06F 3/04842 |
| 11,175,967 | B2* | 11/2021 | Gogate | G06F 3/0482 |
| 11,269,967 | B1* | 3/2022 | Voss | G06F 16/9537 |
| 11,722,449 | B2* | 8/2023 | Zhou | G06F 9/542 |
| | | | | 715/751 |
| 2013/0346882 | A1 | 12/2013 | Shiplacoff et al. | |
| 2017/0185275 | A1* | 6/2017 | Ziegler | G06F 3/04847 |
| 2018/0270180 | A1 | 9/2018 | Chen | |

OTHER PUBLICATIONS

Manalo, Amboy, "Grouped Notifications in IOS 12 Makes Browsing Alerts on Your iPhone Way Less Annoying," Sep. 17, 2018, Available https://ios.gadgethacks.com/how-to/grouped-notifications-ios-12-makes-browsing-alerts-your-iphone-way-less-annoying-0185127/ (Year: 2018).*

International search report of PCT Patent Application No. PCT/CN2021/099342 issued on Sep. 10, 2021.

Extended European Search Report of Counterpart European Patent Application No. 21832148.7 issued on Sep. 1, 2023.

Appletrack, iOS 12: Grouped Notifications & Do Not Disturb Features!, XP093075420, https://www.youtube.com/watch?v=_DFsPOBmQXk, Jun. 4, 2018.

* cited by examiner

LOCK SCREEN DISPLAY PROCESSING METHOD, TERMINAL AND STORAGE MEDIUM

CROSS-REFERENCE TO RELATED APPLICATIONS

This application claims the priority of Chinese patent application CN 202010598997.0, entitled "Lock Screen Display Processing Method, Terminal and Storage Medium" and filed on Jun. 28, 2020, the entirety of which is incorporated herein by reference.

FIELD OF THE INVENTION

The present disclosure relates to the technical field of terminals, and in particular, to a lock screen display processing method, a terminal, and a storage medium.

BACKGROUND OF THE INVENTION

With popularization of terminals, users pay increasing attention to personal privacies on a terminal, and thus a security lock screen function is provided on the terminal. In the related art, if a message notification is received when the screen is locked, the message notification usually pops up in a form of a notification bar and is displayed on a current lock screen interface, and meanwhile the screen is lighted. Messages are generally arranged and displayed according to a temporal order, and are distributed and sequenced from a top to a bottom of the screen. However, with increasing of the number of message notifications, the messages may be folded on the current lock screen interface due to too many message notifications, and may not be arranged and displayed in order on the current lock screen interface. If a user needs to browse all the message notifications without unlocking the screen, a manual click is required to cancel message folding so as to display all history messages respectively, and the screen is required to be swiped downwardly for previewing all the history messages, resulting in difficult operation.

Moreover, after the folded messages are manually cancelled, in addition to useful instant communication messages, a great number of useless notification messages, such as application advertisements and the like, are also released on the current lock screen interface. For the user, these useless messages hinder the user from quickly viewing desired useful information within a short time, and may occupy a display space of a limited terminal screen.

SUMMARY OF THE INVENTION

The main objective of embodiments of the present disclosure is to provide a lock screen display processing method, a terminal, and a storage medium, so as to solve the problems of cumbersome and time-consuming due to that a great number of history messages are previewed by manually swiping the screen upwardly and downwardly and turning a page when a screen is locked, such that the user can preview and extract important information within a short time without unlocking a mobile phone.

According to a first aspect, an embodiment of the present disclosure provides a lock screen display processing method, including: obtaining a message source category corresponding to a received notification message in a case where a screen display space of a current lock screen interface is detected to be insufficient; and displaying the notification message in a drawer layout arrangement according to the message source category.

According to a second aspect, an embodiment of the present disclosure provides a terminal which includes a processor, a memory, a computer program stored on the memory and executable by the processor, and a data bus for realizing connection and communication between the processor and the memory, the computer program, when executed by the processor, implements steps of any lock screen display processing method provided in the present disclosure.

According to a third aspect, an embodiment of the present disclosure provides a computer readable storage medium which stores one or more programs, the one or more programs being executable by one or more processors, so as to implement steps of any lock screen display processing method provided in the present disclosure.

DETAILED DESCRIPTION OF THE EMBODIMENTS

Technical solutions in embodiments of the present disclosure will be described clearly and completely below in conjunction with the accompanying drawings. It is apparent that the embodiments described are part of, rather than all of, the embodiments. All other embodiments obtained by a person of ordinary skills in the art based on the embodiments in the present disclosure without making creative efforts fall into the protection scope of the present disclosure.

The flowcharts shown in the drawings are only exemplary illustration, and it is not necessary to include all contents and operations/steps or follow the described order. For example, some operations/steps may further be divided, combined or partly incorporated. Accordingly, the actual implementation order may change according to actual circumstances.

It should be understood that, terms used in the description of the present disclosure are only for the purpose of describing specific embodiments and is not intended to limit the present disclosure. As used in the description and appended claims of the present disclosure, unless otherwise indicated expressly in the context, the singular form, such as "a", "one", and "the", is intended to include the plural form.

Embodiments of the present disclosure provide a lock screen display processing method, a terminal, and a storage medium. The lock screen display processing method may be applied in a terminal, and the terminal may be a communication device.

Some embodiments of the present disclosure are described in detail below in conjunction with the drawings. The following embodiments and features in the embodiments may be combined with each other without conflict.

Figure 1:
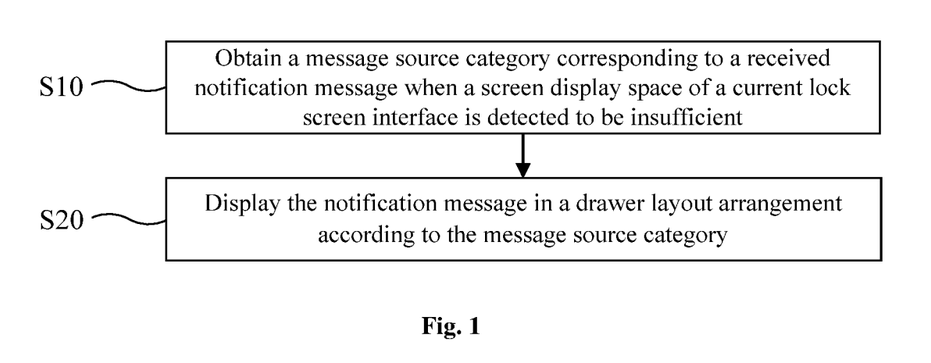
FIG. 1 schematically shows a flowchart of a lock screen display processing method provided according to an embodiment of the present disclosure.

FIG. 1 schematically shows a flowchart of a lock screen display processing method provided according to an embodiment of the present disclosure.

As shown in FIG. 1, the lock screen display processing method includes steps S10 to S20.

At step S10, a message source category corresponding to a received notification message is obtained when a screen display space of a current lock screen interface is detected to be insufficient.

A terminal receives a notification message when a screen of the terminal is locked, the number of notification messages will increase and the notification messages will occupy an entire main screen of the terminal. When the number of the notification messages reaches a preset number and a layout space occupied for distribution and displaying of the notification messages reaches a bottom edge of the main screen, the screen display space of the current lock screen interface may be determined to be insufficient. At this time, a switch for a display mode may be activated to perform lock screen display processing.

It should be understood that, when the screen display space of the current lock screen interface is determined to be insufficient, a querying dialog box may be displayed alternatively to inquiry a user whether the switch for the display mode needs to be activated, or the display mode may be recommended for and selectively activated by the user so as to perform the lock screen display processing.

Correspondingly, the message source category corresponding to the received notification message is obtained when the screen display space of the current lock screen interface is determined to be insufficient.

In some implementations, message source categories may be classified according to respective applications on the terminal. For example, a message A originates from an application a, and a message B originates from a short message function. Or, a message C originates from a social networking software c, and a message D originates from various advertisements d of a software store. The notification messages are categorized according to different sources.

Figure 2:
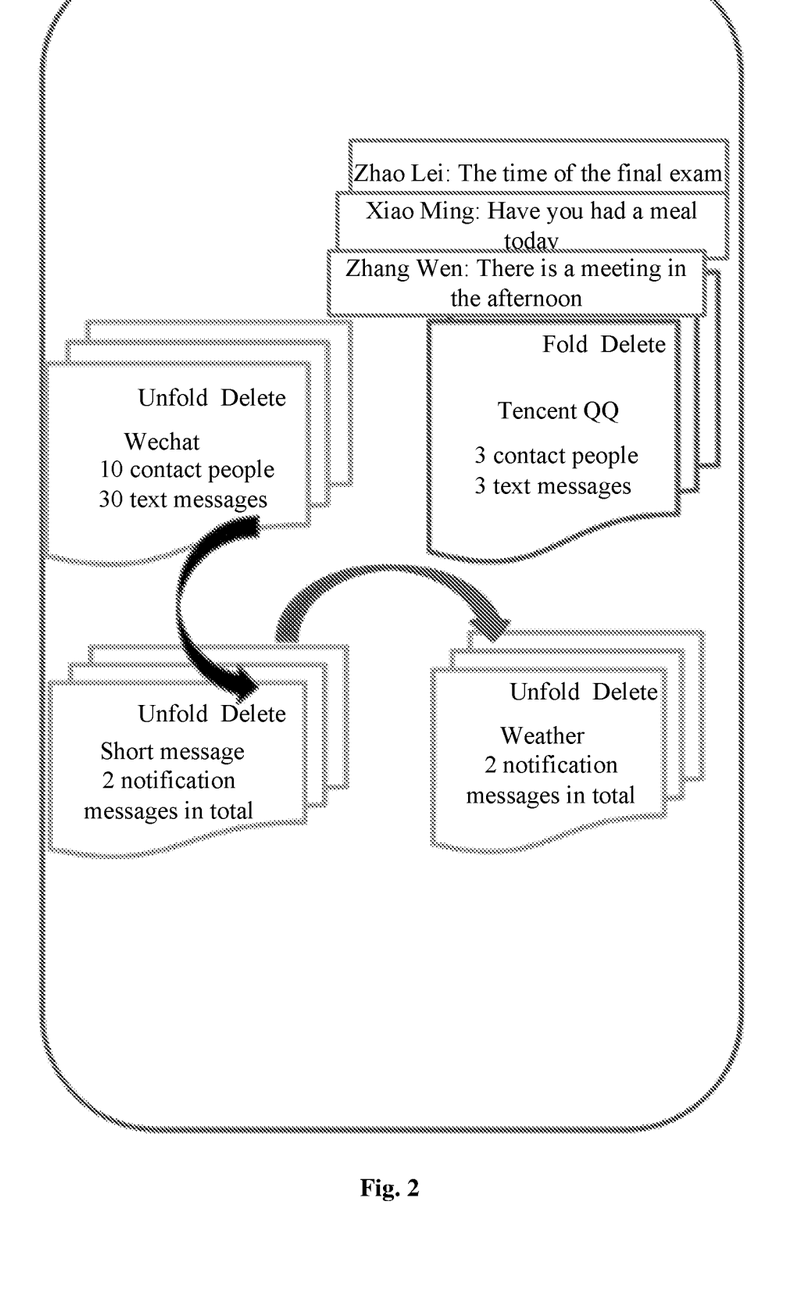
FIG. 2 schematically shows a scene of a lock screen display processing method provided according to an embodiment of the present disclosure.

FIG. 2 shows a message source category corresponding to a notification message.

At step S20, the notification message is displayed in a drawer layout arrangement according to the message source category.

Specifically, displaying the notification message in a drawer layout arrangement according to the message source category may further include: placing the notification messages corresponding to different message source categories in corresponding drawer windows according to the message source categories, respectively; and displaying drawer windows on the main screen corresponding to the current lock screen interface.

In some embodiments, as shown in FIG. 2, the notification messages corresponding to the different message source categories are obtained according to the different message source categories, and the notification messages are displayed in a drawer layout arrangement. Herein, the displaying in drawer layout arrangement means that, the notification message is placed in the corresponding drawer window, and the user may pull the drawer window out by dragging so as to pull out the notification message for previewing. Moreover, all drawer windows are arranged, distributed and displayed on the main screen of the current lock screen interface. The drawer windows may be arranged in a line. If there are a plurality of drawer windows, the drawer windows may further be stacked up. The notification messages corresponding to the different message source categories are placed in the corresponding drawer windows, respectively. For example, a notification message of an application "Wechat" is placed in a Wechat drawer window, and a notification message of an application "short message" is placed in a short message drawer window, and so on. Moreover, respective drawer windows are displayed on the main screen corresponding to the current lock screen interface.

Exemplarily, each of the drawer windows includes the number of messages and a message type stored in the drawer windows. Or, each of the drawer windows includes an unfold button and a delete button.

A main display window of each of the drawer windows may display at the same time the total number of a current notification message category and various message types (for example, an image, a video, an audio, a webpage link), which is convenient for the user to obtain the number of various message categories and a specific type at one time from the respective drawer windows on a main interface of a lock screen and quickly identify useful information needed.

As shown in FIG. 2, the Wechat drawer window includes Wechat messages, which have a number of 30 and a message type of text message. Moreover, the drawer window further includes a unfold button and a delete button.

It should be understood that, when the user clicks the unfold button on the drawer window, the notification messages in the drawer window is displayed to the user in a preview manner, and the unfold button is updated to a fold button. Correspondingly, when the notification message in the drawer window is stored in a folded manner, the fold button is updated to the unfold button for the user to click.

It should be noted that, the delete button further includes a delete-all option and a delete-one option. For example, when the drawer window displays notification messages corresponding to various advertisements of the software store, the user may choose to click the delete-all option according to the user's own requirements, so as to delete all the notification messages corresponding to the various advertisements of the software store. Correspondingly and similarly, the notification messages in corresponding drawer windows of other notification message categories may be unfolded, folded and deleted selectively by the user according to the user's own requirements, which is not described in detail herein.

When the user chooses to delete the notification message, a space occupied in the main screen display space corresponding to the current lock screen interface may be reduced.

Exemplarily, the method further includes: when an adjustment operation instruction, which triggers a drawer window, is received, a layout of the drawer windows is adjusted based on the adjustment operation instruction.

As shown in FIG. 2, when an adjustment operation is performed by the user on the drawer window on the current lock screen interface, the terminal receives the adjustment operation instruction which triggers the drawer window, and adjusts the layout of the drawer windows based on the adjustment operation instruction. For example, the adjustment operation of the user is as follows: long-pressing the drawer window needed to be adjusted, and dragging the drawer window to a position at which the user needs the drawer window to be placed. For example, the short message drawer window is long-pressed, and adjusting of a display mode is activated. At this time, the short message drawer window is adjusted from a lower-left corner of the main screen to a lower-right corner of the main screen. Likewise, the Wechat drawer window is adjusted to the lower-left corner of the main screen. The user may selectively adjust a position of each of respective drawer windows on the main screen according to the user's own requirements.

It should be noted that, the user may also set a display rule. For example, the user may rank respective message sources according to priority. The drawer window that the user wants to view first is disposed at a most visible position on the main screen, and other drawer windows are arranged in order. If the user wants to view the notification message in the Wechat drawer window first, the Wechat drawer window will be placed on a central position of the main screen.

Figure 3:
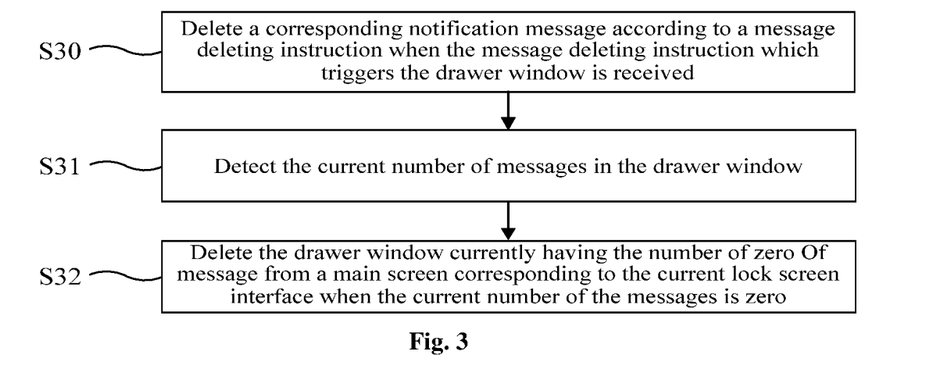
FIG. 3 schematically shows a flowchart of another lock screen display processing method provided according to an embodiment of the present disclosure.

Exemplarily, FIG. 3 schematically shows a flowchart of another embodiment of the present disclosure. The method further includes the following steps.

At step S30, when a message deleting instruction which triggers the drawer window is received, a corresponding notification message is deleted according to the message deleting instruction.

At step S31, a current number of messages in the drawer window is detected.

At step S32, when the current number of the messages is zero, the drawer window currently having the number of zero of message is deleted from the main screen corresponding to the current lock screen interface.

In some embodiments, each drawer window is provided with an unfold/fold button and a delete button. When viewing respective drawer windows, the user may click the unfold/fold button and the delete button, so as to unfold, fold, or delete the notification message.

When the terminal receives the message deleting instruction which triggers the drawer window, the terminal deletes the corresponding notification message according to the message deleting instruction. Then, the terminal detects the current number of the messages in the drawer window. After that, when the current number of the messages is zero, the terminal deletes the drawer window currently having the number of zero of message from the main screen corresponding to the current lock screen interface.

Specifically, the user may directly delete a message of information of a non-critical application, or delete all messages in this drawer window. When the number of messages in the drawer window is zero, the drawer window of messages of this application is no longer displayed on the main screen and does not occupy a main screen space of a mobile phone.

Figure 4:
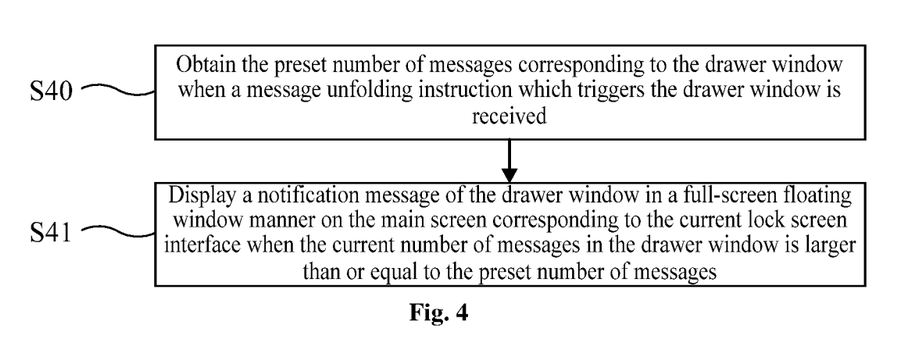
FIG. 4 schematically shows a flowchart of another lock screen display processing method provided according to an embodiment of the present disclosure.

Exemplarily, FIG. 4 schematically shows a flowchart of another embodiment of the present disclosure. The method further includes the following steps.

At step S40, when a message unfolding instruction which triggers the drawer window is received, a preset number of messages corresponding to the drawer window is obtained.

At step S41, when the current number of messages in the drawer window is larger than or equal to the preset number of messages, the notification messages in the drawer window are displayed in a full-screen floating window manner on the main screen corresponding to the current lock screen interface.

In a case of a plurality of messages, in consideration of that each drawer window has a limited screen space for simultaneous previewing and displaying, a display mode for switching to a maximum message previewing and displaying space may be adopted. If the number of messages exceeds a maximum number of messages (the preset number of messages) that may be previewed and displayed in each drawer window, after the unfold button is clicked and the drawer window unfolds, the drawer window covers, in the full-screen floating window manner, other displayed drawer window interfaces, and is displayed on the current entire main screen space. As shown in FIG. 2, if the preset number of messages is 30, when the user clicks the unfold button on the Wechat drawer window, the Wechat drawer window covers, in the full-screen floating window manner, other displayed drawer window interfaces (e.g., the short message drawer window), and is displayed on the current entire main screen space, such that the user may preview the notification messages in the drawer window as many as possible.

When the user clicks the fold button, the terminal receives a folding operation instruction which triggers the drawer window, and folds the notification messages of the drawer window into the drawer window, such that all notification messages of the drawer window corresponding to a current application are put away.

When the message type is a non-text message, if a preview operation instruction which triggers the non-text message is received, the non-text message is displayed in the full-screen floating window manner on the main screen corresponding to the current lock screen interface.

Then, an authorization to access local storage is offered, and based on a received storing operation instruction which triggers the non-text message, a non-text document corresponding to the non-text message is saved locally.

In some embodiments, the message type may include a type of a non-text message and a type of a text message. The non-text message includes notification messages, such as an image notification message, a video notification message, an audio notification message, and the like, except the text notification message.

For example, if the non-text message is an image notification message, when the user click the unfold button, the user may directly preview an image document corresponding to the image notification message. To facilitate a clear viewing of the image by the user, the image may be displayed in the full-screen floating window manner.

Specifically, the terminal may offer the authorization to access the local storage, and an authorization to access local image storage may be invoked when the screen is locked, such that an image may be saved to a local album by long-pressing an area of the image.

Figure 5:
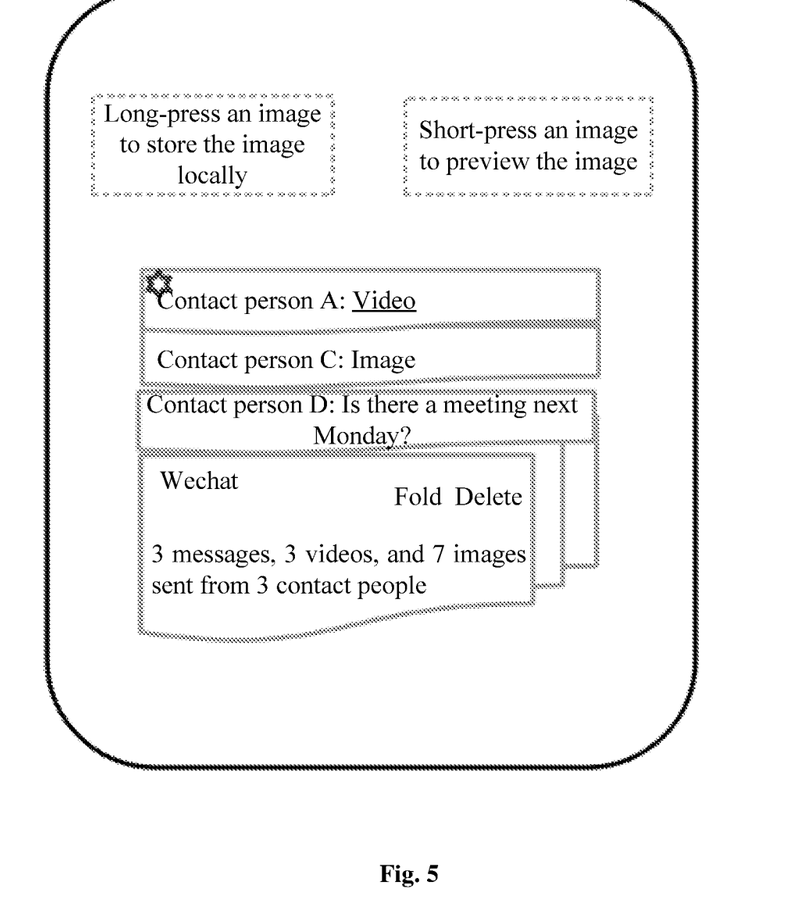
FIG. 5 schematically shows another scene of another lock screen display processing method provided according to an embodiment of the present disclosure.

As shown in FIG. 5, an image may be previewed through short-pressing the image of a notification message of a contact person C by the user, and then may be saved to the local album through long-pressing the image by the user.

Exemplarily, when the message type is a type of the text message, if a dumping operation instruction which triggers the text message is received, the text message is dumped from a current drawer window to a to-be-viewed window.

Figure 6:
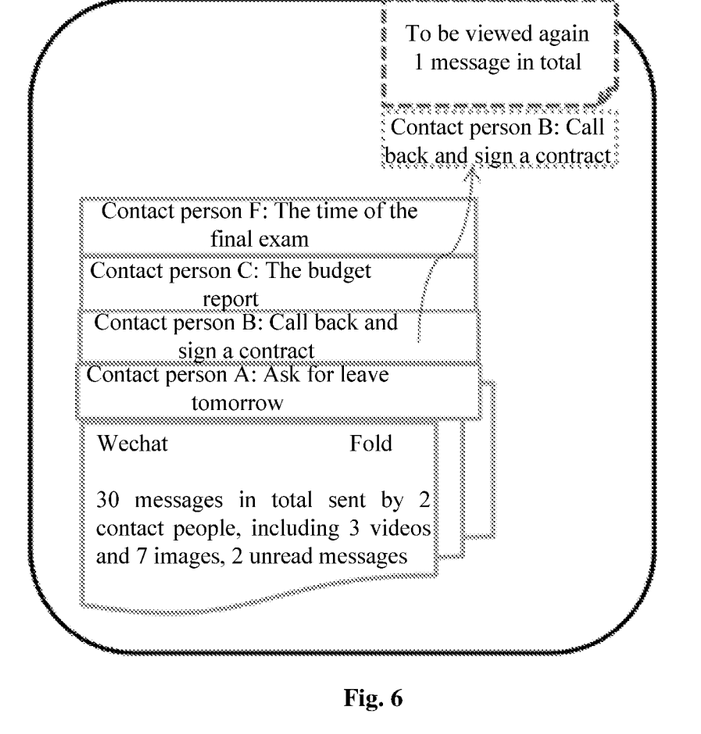
FIG. 6 schematically shows another scene of another lock screen display processing method provided according to an embodiment of the present disclosure.

Specifically, in consideration of that the user has limited time to preview information when the screen is locked, part of the information may not be previewed and viewed completely in a case of a great amount of information, or relatively important information may need to be viewed again in an idle time. Accordingly, a processing manner for manually screening out important information by the user is provided. For a notification message which is identified as the text message, a to-be-viewed-again drawer window may be invoked at the top of the notification message by long-pressing the notification message, and the message may be manually dragged into the drawer window. When at least one message is dragged into the to-be-viewed-again drawer window, this drawer window is also arranged and displayed on the main interface of the lock screen and displays the number of messages to be viewed again, so as to remind the user of viewing the message. If the user does not perform an operation of dragging to-be-viewed-again information, the drawer window is not displayed on the current main interface of the lock screen and does not occupy the main screen display space.

As shown in FIG. 6, notification information of a contact person B is dumped into the to-be-viewed window, so as to facilitate a second viewing of the notification message by the user.

Figure 7:
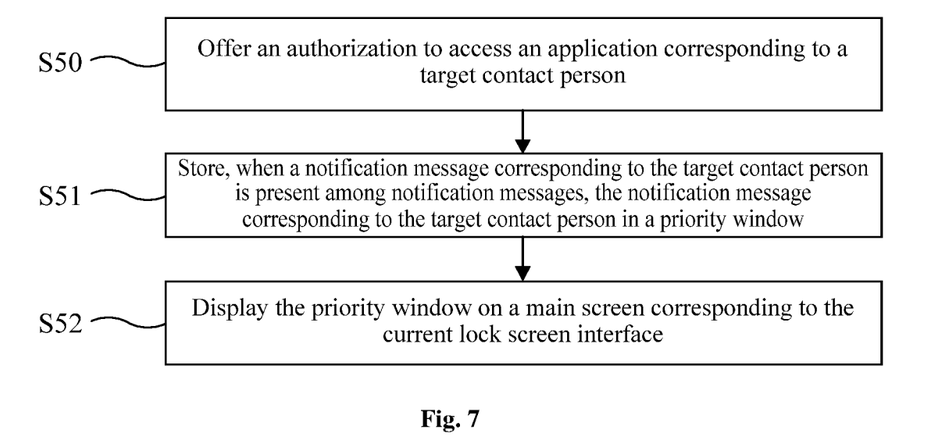
FIG. 7 schematically shows a flowchart of another lock screen display processing method provided according to an embodiment of the present disclosure.

Exemplarily, FIG. 7 schematically shows a flowchart of another embodiment of the present disclosure. The method further includes the following steps.

At step S50, an authorization to access an application corresponding to a target contact person is offered.

At step S51, when a notification message corresponding to the target contact person is present among notification messages, the notification message corresponding to the target contact person is stored in a priority window.

At step S52, the priority window is displayed on a main screen corresponding to the current lock screen interface.

In some embodiments, a priority reminding function for notification messages of some important target contact people may further set by the user. In this case, the terminal offers the authorization to access the application corresponding to the target contact person. Then, when the notification message corresponding to the target contact person is present among the notification messages, the notification message corresponding to the target contact person is stored in the priority window. After that, the priority window is displayed on the main screen corresponding to the current lock screen interface.

A received message notification is matched according to information of a starred contact person preset by the user. The starred contact person may be displayed preferentially, and a star mark may be displayed on a preview interface of the drawer window, so as to facilitate reminding the user of viewing a message of an important contact person.

Figure 8:
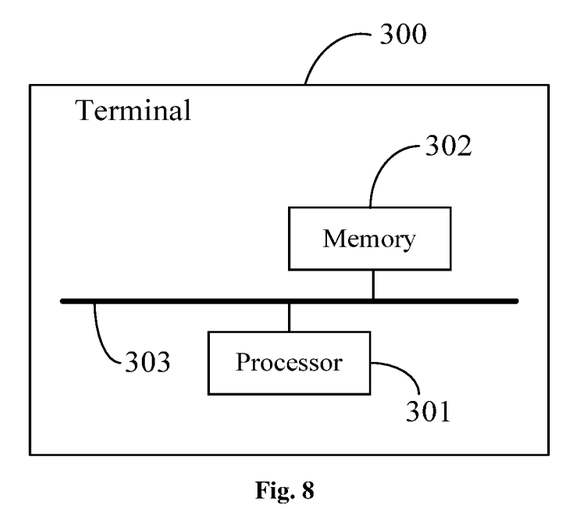
FIG. 8 schematically shows a block diagram of a structure of a terminal provided according to an embodiment of the present disclosure.

FIG. 8 schematically shows a block diagram of a structure of a terminal 300 provided according to an embodiment of the present disclosure.

Exemplarily, the terminal 300 may be a mobile phone, a tablet, a notebook computer, a dedicated input device, an ATM, or the like.

As shown in FIG. 8, the terminal 300 includes a processor 301 and a memory 302. The processor 301 and the memory 302 may be connected to each other via a bus 303. The bus 303 may be, for example, an I2C (inter-integrated circuit) bus.

Specifically, the processor 301 may be configured to provide computing and controlling capabilities so as to support operation of the whole terminal. The processor 301 may be a central processing unit (CPU), and the processor 301 may alternatively be other general purpose processor, digital signal processor (DSP), application specific integrated circuit (ASIC), field-programmable gate array (FPGA), or other programmable logic device, discrete gate or transistor logic device, discrete hardware component, and the like. The general purpose processor may be a microprocessor, or the processor may be any common processor and the like.

Specifically, the memory 302 may be a flash chip, a read-only memory (ROM), a magnetic disk, an optical disk, a USB flash disk, or a mobile hard disk drive, or the like.

Those skilled in the art may understand that the structure shown in FIG. 8 is only a block diagram of a partial structure that is relevant to the solution of the embodiment of the present disclosure and does not constitute a limitation on the application of the solution of the embodiment of the present disclosure on the terminal. A specific server may include more or less components than those shown in the drawing, include a combination of some components, or have a different arrangement of components.

The processor is configured to execute a computer program stored in the memory, and implements, when executing the computer program, any lock screen display processing method provided by the embodiment of the present disclosure.

In an embodiment, the processor is configured to execute a computer program stored in the memory, and implements, when executing the computer program, following steps of the method: obtaining a message source category corresponding to a received notification message when a screen display space of a current lock screen interface is detected to be insufficient; and displaying the notification message in a drawer layout arrangement according to the message source category.

In an embodiment, the processor is configured to execute a computer program stored in the memory, and implements, when executing the computer program, following steps of the method: placing notification messages corresponding to different message source categories in corresponding drawer windows according to message source categories, respectively; and displaying drawer windows on a main screen corresponding to the current lock screen interface.

In an embodiment, each of the drawer windows includes the number of messages and a message type stored in the drawer window. Or, each of the drawer windows includes an unfold button and a delete button.

In an embodiment, the processor is configured to execute a computer program stored in the memory, and further implements, when executing the computer program, a following step of the method: adjusting an arrangement manner of the drawer windows based on an adjustment operation instruction when the adjustment operation instruction which triggers the drawer window is received.

In an embodiment, the processor is configured to execute a computer program stored in the memory, and further implements, when executing the computer program, following steps of the method: deleting a corresponding notification message according to a message deleting instruction when the message deleting instruction which triggers the drawer window is received; detecting the current number of messages in the drawer window; and deleting the drawer window currently having the number of zero of message from the main screen corresponding to the current lock screen interface when the current number of the messages is zero.

In an embodiment, the processor is configured to execute a computer program stored in the memory, and further implements, when executing the computer program, following steps of the method: obtaining a preset number of messages corresponding to the drawer window when a message unfolding instruction which triggers the drawer window is received; and displaying a notification message of the drawer window in a full-screen floating window manner on the main screen corresponding to the current lock screen interface when the current number of messages in the drawer window is larger than or equal to the preset number of messages.

In an embodiment, the processor is configured to execute a computer program stored in the memory, and further implements, when executing the computer program, a following step of the method: folding the notification message of the drawer window into the drawer window when a folding operation instruction which triggers the drawer window is received.

In an embodiment, the processor is configured to execute a computer program stored in the memory, and further implements, when executing the computer program, following steps of the method: displaying, when the message type is a type of a non-text message, the non-text message in a full-screen floating window manner on the main screen corresponding to the current lock screen interface if a preview operation instruction which triggers the non-text message is received; and offering an authorization to access local storage, and saving a non-text document corresponding to the non-text message locally based on a received storing operation instruction which triggers the non-text message.

In an embodiment, the processor is configured to execute a computer program stored in the memory, and further implements, when executing the computer program, a following step of the method: dumping, when the message type is a type of a text message, the text message from a current drawer window to a to-be-viewed window if a dumping operation instruction which triggers the text message is received.

In an embodiment, the processor is configured to execute a computer program stored in the memory, and further implements, when executing the computer program, the following steps of the method: offering an authorization to access an application corresponding to a target contact person; storing, when a notification message corresponding to the target contact person is present among notification messages, the notification message corresponding to the target contact person in a priority window; and displaying the priority window on a main screen corresponding to the current lock screen interface.

It should be noted that, those skilled in the art may clearly know that, for convenience and clarity of description, a specific working process of the terminal may refer to a corresponding process in preceding embodiments of the lock screen display processing method for, which is not described in details herein.

An embodiment of the present disclosure further provides a computer readable storage medium. The storage medium stores one or more programs, and the one or more programs may be executed by one or more programs, so as to implement steps of any lock screen display processing method provided according to the embodiment of the present disclosure.

Herein, the storage medium may be an internal storage unit of the terminal in the preceding embodiment, for example, a hard disk or a memory of the terminal. The storage medium may alternatively be an external storage device of the terminal, for example, an insertion hard disk, a smart media card (SMC), a secure digital (SD) card, a flash card, or the like, equipped on the terminal.

A person of ordinary skills in the art may understand that, all or some steps of the method disclosed above and functional modules/units of a system or a device may be implemented as software, firmware, hardware, and a proper combination thereof. In an embodiment of the hardware, a division of the functional modules/units mentioned in the above description does not necessarily correspond to a division of physical components. For example, one physical component may have multiple functions, or one function or step may be implemented by several physical components cooperatively. Some physical components or all physical components may be implemented as software executed by a processor, such as a central processor, a digital signal processor or a microprocessor, or may be implemented as hardware, or may be implemented as an integrated circuit, such as an application-specific integrated circuit. Such software may be distributed on a computer readable medium, and the computer readable medium may include a computer storage medium (or non-transient medium) and a communication medium (or transient medium). As is known to a person of ordinary skills in the art, the term, computer storage medium includes volatile and non-volatile, removable and non-removable mediums that may be implemented in any method or technology for storing information (such as a computer readable instruction, a data structure, and a program module or other data). The computer storage medium includes, but is not limited to, an RAM, an ROM, an EEPROM, a flash memory or other memory technology, a CD-ROM, a digital video disk (DVD) or other optical disk storage, a magnetic cassette, a magnetic tape, a magnetic disk storage or other magnetic storage device, or any other medium which can be used to store the desired information and can be accessed by a computer. Besides, it is known to a person of ordinary skills in the art that, the communication medium generally includes a computer readable instruction, a data structure, a program module or other data in a modulated data signal such as a carrier wave or other transport mechanism and may include any information delivery medium.

The present disclosure provides a lock screen display processing method, a terminal, and a storage medium. When the screen display space of the current lock screen interface is insufficient, different notification messages are categorized according to the message source categories and displayed in a drawer layout arrangement. In this way, the user can view the messages according to different message source categories without unlocking the screen, and less display space is occupied. Besides, when notification messages occupy the current entire main screen space, a cumbersome operation of manually swiping the screen upwardly and downwardly and turning a page so as to preview all the notification messages on the lock screen interface can be avoided.

It should be understood that, the wording "and/or" used in the description and appended claims of the present disclosure refers to any or all combinations of one or more relevant listed items and includes these combinations. It should be noted that, in the text, the terms "include", "comprise", or any other variation thereof, are intended to cover a non-exclusive inclusion, such that a process, method, article, or system that includes a list of elements includes not only those elements but may include other elements not expressly listed or inherent to such process, method, article, or system. An element preceded by "includes a . . . " does not, without more constraints, preclude the existence of additional identical elements in the process, method, article, or system that includes the element.

Serial numbers of embodiments of the present disclosure are used for description only, and does not indicate that one embodiment is better than another one. The above description only involves specific embodiments of the present disclosure, but the protection scope of the present disclosure is not limited to this. Any person skilled in the art can easily conceive of various equivalent modifications or replacements within the technical scope disclosed in the present disclosure, and all these modifications or replacements shall fall into the protection scope of the present disclosure.

The invention claimed is:

1. A lock screen display processing method, comprising:
    obtaining a message source category corresponding to a received notification message in a case where a screen display space of a current lock screen interface is detected to be insufficient; and
    displaying the notification message in a drawer layout arrangement according to the message source category;
    wherein displaying the notification message in the drawer layout arrangement according to the message source category comprises:
    placing notification messages corresponding to different message source categories in corresponding drawer windows according to message source categories, respectively; and
    displaying the drawer windows on a main screen corresponding to the current lock screen interface;
    the lock screen display processing method further comprises:
    obtaining a preset number of messages corresponding to a drawer window in a case where a message unfolding instruction which triggers the drawer window is received; and
    displaying the notification message of the drawer window in a full-screen floating window manner on the main screen corresponding to the current lock screen interface in a case where a current number of messages in the drawer window is larger than or equal to the preset number of messages.

2. The lock screen display processing method according to claim 1, wherein each of the drawer windows comprises the number of messages and a message type stored in the drawer windows.

3. The lock screen display processing method according to claim 2, further comprising:
    displaying, in a case where the message type is a type of non-text message, the non-text message in a full-screen floating window manner on the main screen corresponding to the current lock screen interface in response to a preview operation instruction which triggers the non-text message is received; and
    offering an authorization to access local storage, and saving a non-text document corresponding to the non-text message locally based on a received storing operation instruction which triggers the non-text message.

4. The lock screen display processing method according to claim 2, further comprising:
    dumping, in a case where the message type is a type of text message, the text message from a current drawer window to a to-be-viewed window in response to a dumping operation instruction which triggers the text message is received.

5. The lock screen display processing method according to claim 1, further comprising:
    adjusting a layout of a drawer window based on an adjustment operation instruction in a case where the adjustment operation instruction which triggers the drawer window is received.

6. The lock screen display processing method according to claim 5, wherein the adjusting the layout of a drawer window based on the adjustment operation instruction in a case where the adjustment operation instruction which triggers the drawer window is received comprises:
    long-pressing the drawer window needed to be adjusted, and dragging the drawer window to a position at which a user needs the drawer window to be placed.

7. The lock screen display processing method according to claim 5, wherein a drawer window that a user wants to view first is disposed at a most visible position on the main screen, and other drawer windows are arranged in order.

8. The lock screen display processing method according to claim 1, further comprising:
    deleting a corresponding notification message according to a message deleting instruction in a case where the message deleting instruction which triggers a drawer window is received;
    detecting the current number of messages in the drawer window; and
    deleting the drawer window of which the current number of messages is zero from the main screen corresponding to the current lock screen interface in a case where the current number of the messages is zero.

9. The lock screen display processing method according to claim 1, wherein after displaying the notification message of the drawer window in the full-screen floating window manner on the main screen corresponding to the current lock screen interface in a case where the current number of messages in the drawer window is larger than or equal to the preset number of messages, the method further comprises:
    folding the notification message of the drawer window into the drawer window in a case where a folding operation instruction which triggers the drawer window is received.

10. The lock screen display processing method according to claim 1, further comprising:
    offering an authorization to access an application corresponding to a target contact person;
    storing, in a case where a notification message corresponding to the target contact person is present among notification messages, the notification message corresponding to the target contact person in a priority window; and
    displaying the priority window on a main screen corresponding to the current lock screen interface.

11. A terminal, comprising: a processor, a memory, a computer program stored on the memory and executable by the processor, and a data bus for realizing connection and communication between the processor and the memory, wherein the computer program, when executed by the processor, implements steps of the lock screen display processing method according to claim 1.

12. A non-transitory computer readable storage medium storing one or more programs thereon, wherein the one or more programs are executable by one or more processors, to implement steps of the lock screen display processing method according to claim 1.

13. The lock screen display processing method according to claim 1, wherein
    each of the drawer windows comprises an unfold button and a delete button.

* * * * *